United States Patent [19]

Buntin, Jr.

[11] Patent Number: 5,860,198
[45] Date of Patent: Jan. 19, 1999

[54] ANCHORING DEVICE HAVING A RAPID RELEASE CLASP

[75] Inventor: Robert W. Buntin, Jr., Sherborn, Mass.

[73] Assignee: Buntin Foundry, Inc., Sherborn, Mass.

[21] Appl. No.: 893,727

[22] Filed: Jul. 11, 1997

[51] Int. Cl.⁶ .................................................. A44B 13/00
[52] U.S. Cl. ...................... 24/600.5; 24/598.4; 24/600.7; 119/797
[58] Field of Search ............................. 24/600.5, 598.4, 24/600.6, 600.7, 601.7; 119/797

[56] References Cited

U.S. PATENT DOCUMENTS

| Re. 09,527 | 1/1881 | Covert | 24/600.7 |
|---|---|---|---|
| 0,505,281 | 9/1893 | Smith | 24/600.7 |
| 1,228,513 | 6/1917 | Anderson | 24/600.7 |
| 2,457,435 | 12/1948 | Beckman | 24/600.5 |
| 2,701,402 | 2/1955 | Foster | 24/600.5 |
| 3,332,398 | 7/1967 | Mintz | 119/797 |
| 4,277,866 | 7/1981 | Song | 24/600.6 |
| 4,372,016 | 2/1983 | La Violette et al. | 24/598.4 |
| 5,361,726 | 11/1994 | Harris et al. | 119/797 |

*Primary Examiner*—Victor N. Sakran
*Attorney, Agent, or Firm*—Sharon L. Day

[57] ABSTRACT

An anchoring device having a clasp region and a closure means for rapid release, a body for grasping, and an attachment means for receiving a tethering means such as a lead, leash, rope or the like, is provided. The clasp region has a gateway opening at its outer most tip. The closure means is preferably a spring biased rotary arm actuated by a thumb nub which allows rapid release in the direction to of pull of a harness, belt, or rope when a portion of the aforesaid is encircled by the clasp and the thumb nub is actuated. While the inventive anchoring device may be used in a variety of ways such as for rock climbing or industrial safety harnesses, the anchoring device is especially useful for animal husbandry where restraining devices, such as for example, leads or leashes used to guide animals, are terminated by clasps.

20 Claims, 5 Drawing Sheets

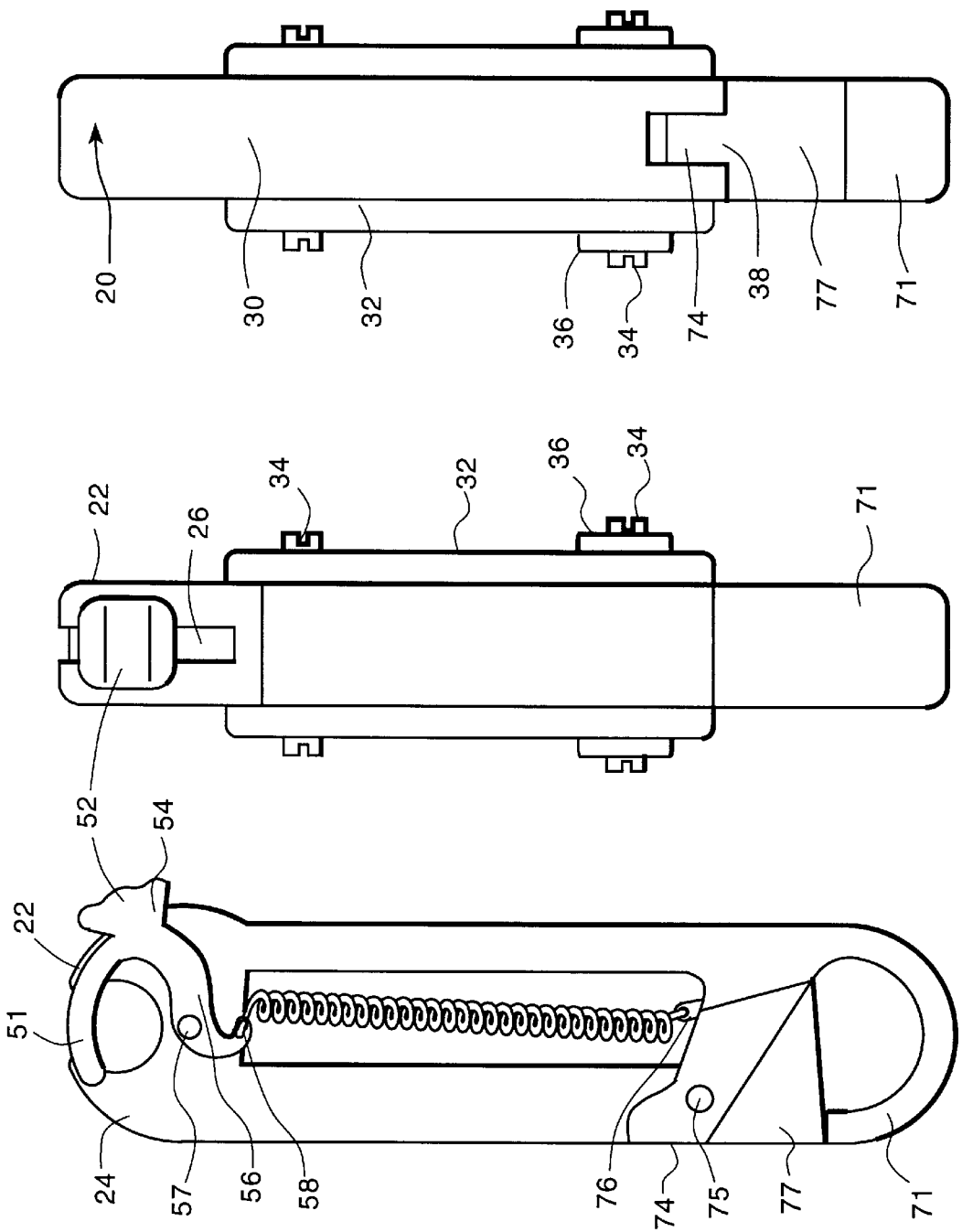

ANCHORING DEVICE HAVING A RAPID RELEASE CLASP

TECHNICAL FIELD

This invention relates to the field of anchoring devices for connecting harnesses, halters, collars, and the like to leads, leashes, belts and the like. The inventive anchoring device has a rapid release rotary clasp design. Such an anchoring device finds use in the fields of animal husbandry, industrial safety lines and harnesses, and sporting equipment.

BACKGROUND INFORMATION

An anchoring device for attaching a line, lead or leash to a harness, halter, collar or the like generally has two opposing ends. At one end of the anchoring device is a means for attaching the anchoring device to the line, lead or leash. At the opposite end is a hook and nose portion. A gateway blocked by a movable gate is situated between the hook and nose portions. In order to detach the anchoring device from that which the hook portion encircles such as a ring portion of a harness, the gateway is opened and the hook portion is manipulated to free the ring.

In animal husbandry, current restraining devices for animals utilize a carabineer or a snap hook for attaching a lead or leash to an animal harness, halter or collar. U.S. Pat. No. 5,361,726 (Harris) illustrates a C-shaped carabineer having an inwardly opening gate which is similar in design to carabineers used for mountaineering. U.S. Pat. Nos. 5,373,814 (Seymour) and 5,351,654 (Fuentes) illustrate various types of snap hooks that have been suggested for use with devices for restraining animals. None provides a gateway and gate which would allow release of an animal in the direction the animal was pulling.

When a highly excitable animal is restrained, rapid release may be desirable to prevent injury to either the handler or the animal itself. For example, when a young horse is led from the barn to the pasture, the horse may exert a strong pull on the anchoring device or snap hook attached to the lead held by the handler. As the horse pulls away, force is exerted upon the upper most curved portion of the hook making release difficult because the hook portion must be manipulated to free the harness. Further, this force can bend the hook, thereby enlarging the gateway until the animal escapes prematurely and the snap hook is rendered useless. If the anchoring device is not easily releasable, the handler may be forced to drop the lead rather than release it, thus risking entanglement of the horse in the lead. Alternatively, the handler may be injured by contact with the animal while attempting to manipulate the hook portion around the harness portion.

Similarly, when a worker is using a safety harness, dangerous situations occur which require rapid release of the worker in order to avoid injury. However, if the worker is disengaged prematurely injury is also possible. In both situations, the anchoring device should be easy to grasp quickly to facilitate rapid release, strong enough to prevent premature release, and easy to free.

It is an object of this invention to provide an anchoring device which rapidly releases at one end in the direction of pull, while remaining secured at the opposing end. It is a further object of this invention to provide an anchoring device which is easy to grasp, to manipulate, and to control. It is a still further object of this invention to provide a strong, but rapidly releasable anchoring device that has a clasp which requires minimum hand strength to open.

When used in animal husbandry, it is an object of this invention to provide an anchoring device which allows the animal handler greater, safer control over the animal.

SUMMARY

An anchoring device for connecting a lead, leash, line or the like to a harness, collar, ring or the like is provided. The anchoring device has an elongated body for grasping, a clasp region having a gateway and a closure means for rapid release at the first end of the body, a pivot pin for mounting the closure means in the clasp region, and an attachment means for receiving a lead, leash, line or the like at the second end of the body. The clasp region has a hollowed area for receiving the closure means, a pivot point for receiving the pivot pin, and two opposing clasp arms. The gateway (also called a "mouth opening") of the clasp region is located between the two clasp legs which are at the outer most end of the anchoring device opposite the attachment means. In the preferred embodiment, the closure means is a rotary arm. The rotary arm has a first end which extends from the first clasp leg to the second clasp leg when the gateway is in the "closed" position. At the second end of the rotary arm is a means for attaching the rotary arm to a biasing means, such as for example, a spring. Between the first and second rotary arm ends is a curved region having a contact area for movement of the rotary arm by a digit of a hand, such as for example, a thumb nub or a ridged region. The rotary arm also has a pivot point for receiving a pivot pin. The biasing means is seated in the hollow interior of the elongated body and is attached at one end to the rotary arm and at the other end to the elongated body in the region of the attachment means. Preferably, a cover plate encloses the hollowed regions and the parts seated therein.

When the clasp is in the "closed" position, the rotary arm forms a tight closure with the leg of the clasp opposite the leg from which the arm is extended, thereby securely blocking the mouth. A portion of the harness, collar, ring or the like can be encircled by the clasp. Actuation of the contact area, such as the thumb nub, results in withdrawal of the rotary arm from across the gateway and compression of the biasing means. When pull in the direction of the gateway or mouth is exerted on the encircled portion of the harness, collar, ring, or the like and the rotary arm has been withdrawn, the harness, collar, ring, or the like is released through the clasp gateway without further manipulation of the clasp. When the thumb nub is released, the arm snaps back into position across the gateway as the spring is decompressed. Alternatively, actuation of the contact region can stretch the biasing means when the rotary arm is moved from the gateway. The method of attachment of the biasing means to the rotary arm and the placement of the contact area determine the biasing mechanism utilized Variations on the attachment means end of the anchoring device are provided. The attachment means can be permanent closed or can have a gateway which can be opened and closed. Further, the attachment means can be fixedly attached to the body or rotatably attached to the body, as for example, by a swivel. When the attachment means includes a gateway, it is preferred that the gateway closure, be it arm or latch, opens so as not to impede the removal of an encircled object. Thus, the attachment means may have a rotary arm closure at both ends of the anchoring device. Or, a snap hook may be present. In the preferred embodiment of the attachment means, the latch is spring biased and opens outwardly when pulled from the gateway. Release of the latch results in reseating of the latch in the gateway.

BRIEF DESCRIPTION OF THE DRAWINGS

FIG. 8 is a cut away side view of the instant invention shown in FIG. 7 where both ends are in the closed position.

FIG. 9 is a top plan view of the instant invention of FIG. 7.

FIG. 10 is a bottom plan view of the instant invention of FIG. 7.

DETAILED DESCRIPTION OF THE PREFERRED EMBODIMENT

Figure 1:
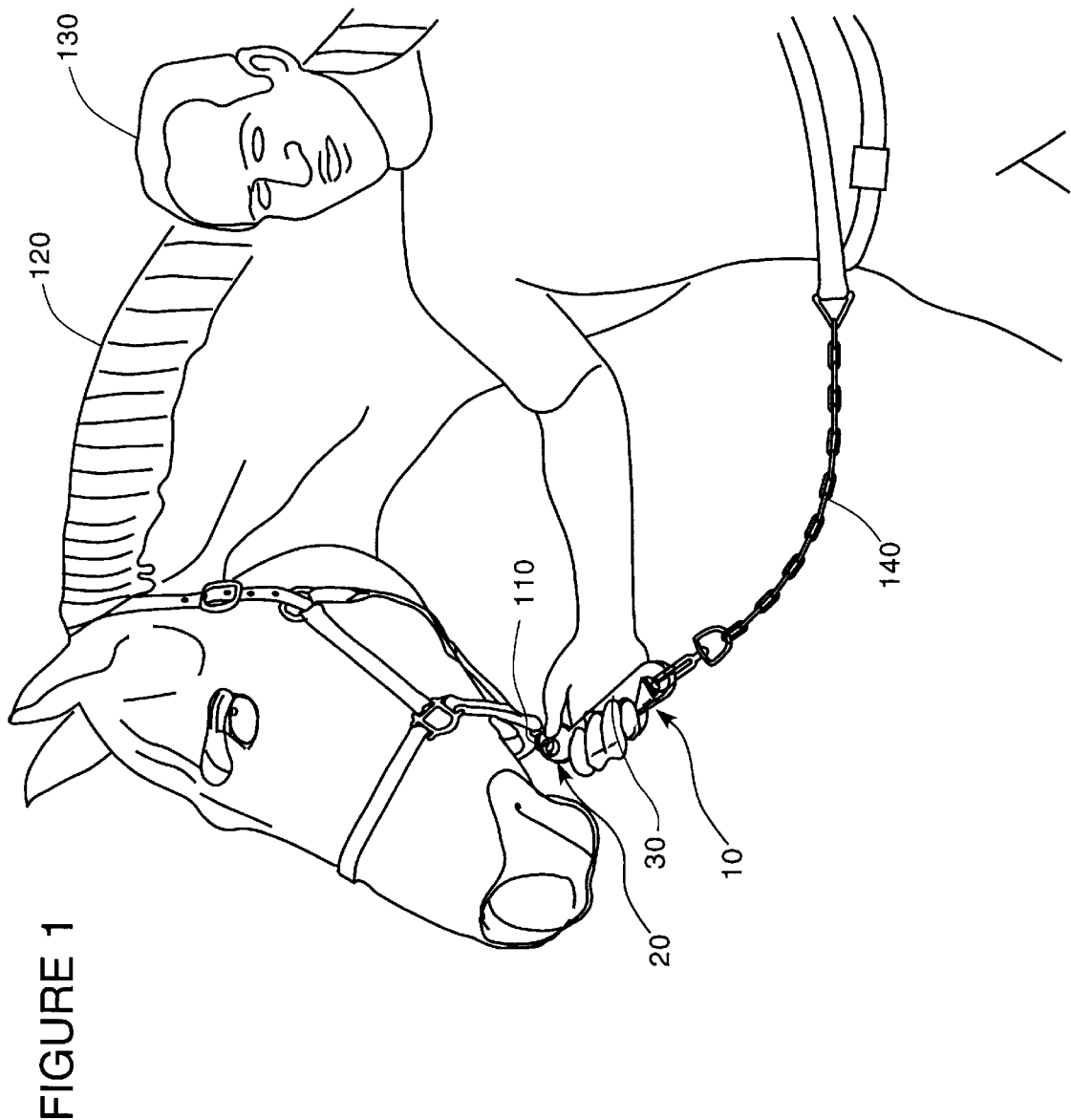
FIG. 1 illustrates a side perspective view of the instant invention in use by an animal handler to restrain a horse while preparing to release the horse.

With reference to the drawings and in particular to FIG. 1, a use of the anchoring device having a rapid release clasp, generally indicated by reference numeral 10, is illustrated. The anchoring device is attached at its first end, the clasp region or gateway end, to the halter ring 110 of a horse 120 and is attached at its second end, the attachment means end, to a lead 140. An animal handler 130 is shown grasping the body 30 of the anchoring device and the clasp region 20 at the thumb nub of the clasp, in preparation for releasing the horse from the lead 140.

For additional control of an animal, a chain having a snap hook at one end may be used on the muzzle of the animal. The chain is formed into a loop by placing an entire link in the snap hook opening, much like a rope is formed into a lasso. The loop is slipped around the nose or muzzle region of the animal's head and the free end of the chain is passed through the halter, usually at the chin ring, to form a slip loop. The anchoring device is then attached at the clasp region to the end of the chain. Thus, when the animal tries to pull its head away, the muzzle is firmly grasped by the chain. Such a chain and snap hook combination for use with the instant invention is available from Iron Horse Co. and from Foxwood, Co. When release of the animal is desired, the end of the chain is released from the gateway of the anchoring device just as the ring would be. The chain loosens and falls from the animal's muzzle.

Figure 2:
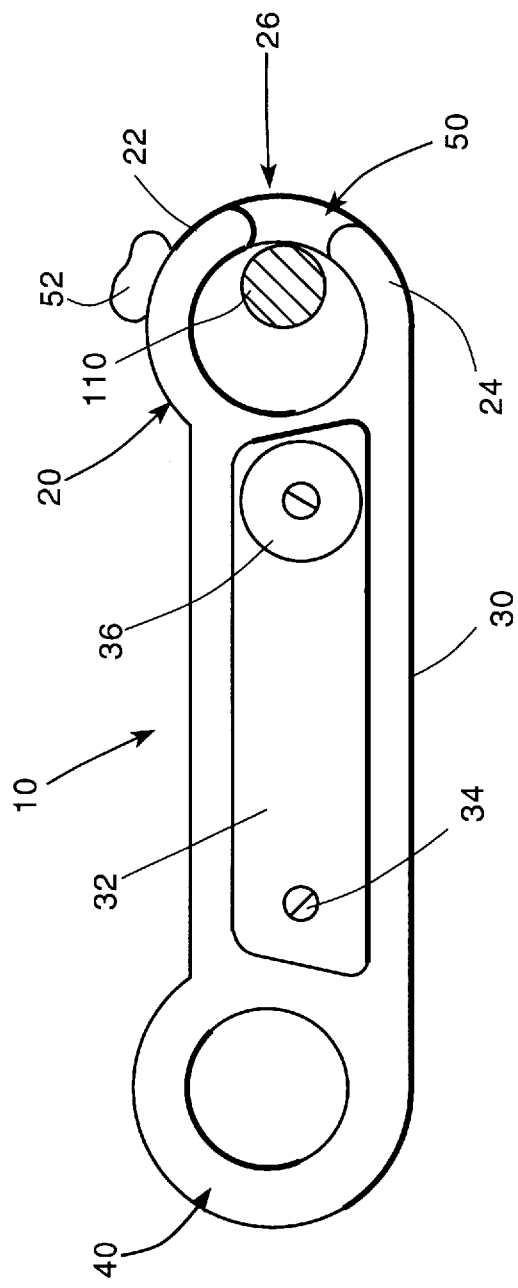
FIG. 2 is a side view of the instant invention illustrating, at the first end of the invention, a gateway member having a rotary arm and, at the second end, a first embodiment of an attachment means, where the gateway member is in the closed position.

With reference to FIG. 2, a first embodiment of the anchoring device of the instant invention illustrated in FIG. 1 is shown in greater detail. As in FIG. 1, the instant invention is generally indicated by the reference numeral 10.

The clasp region 20 having a gateway and a closure means, which in this embodiment is a rotary arm 50, is shown with the rotary arm in the closed position. The clasp region encircles a cross-section of a halter ring 110 and is located at the first end of an elongate body portion 30. The first embodiment of the attachment means, generally indicated by the reference numeral 40, is continuous with the second end of the body portion and is illustrated as an eye ring. The attachment means facilitates connecting the anchoring device to a tethering means such as a line, lead or leash.

The body portion has a hollow interior which forms a housing. The body is made from unbreakable plastic or metal. The metal for the body is preferably cast bronze, stainless steel, or titanium. The body is elongated to facilitate grasping by the handler and to allow the handler to control the clasp region while releasing the animal.

The exterior of the body portion 30 has a cover plate 32 fixedly attached thereto by screws or rivets 34. The cover plate is seated over the hollow housing region, which houses the biasing means, and extends to cover the second end of the rotary arm. The cover plate may have a smooth surface or may have a roughened surface for improved gripping. The cover plate may be metal, plastic, wood, rubber or a composite. Preferably, the cover plate is a light weight plastic. Alternatively, the cover plate may snap on by virtue of extensions in the flexible cover plate which engage the body at a wall surrounding the hollow region. A text ring 36 for displaying the trade name, model number, or other information may be securely mounted between the head of the screw or rivet and the cover plate 32 or text may be stamped directly on the cover plate.

The clasp region is a C-shaped extension of the first end of the body portion where the substantially curvilinear backbone area of the C is connected to the body and the gateway is located at the outer most point at the first end of the anchoring device. The C portion has two legs 22, 24, which are spaced apart one from the other and which extend from either side of the C-backbone. The space between the legs is termed a gateway or mouth opening 26. In FIG. 2, the gateway is occupied by the first end or finger of a rotary arm generally indicated by reference numeral 50 which extends from the foot of leg 22 towards the foot of leg 24. Extending from a slot in the leg 22 and attached to the rotary arm is a thumb nub 52 which when actuated biases the rotary arm 50 from the closed position shown in FIG. 2 to the open or retracted position shown in FIG. 3. The tip of the arm may firmly contact a solid foot of leg 24 or the end of the arm may engage the foot at a slot or indentation.

The shape of the clasp region may be varied as long as the mouth opening is positioned at the tip of the clasp region opposite the attachment means end of the body. For example, the clasp region may be substantially U-shaped such that the sides of the clasp region are essentially elongations of the sides of the body portion.

At the second end of the body portion is an attachment means 40. In the first embodiment of the attachment means which is illustrated in FIG. 2, the attachment means is an eye ring which is integral with the body portion. A lead, leash, rope or belt can be attached thereto and tied, sewn or snapped in place. Alternatively, the eye ring may be mounted on a swivel connector and the swivel connector may engage the second end of the body portion ( not shown).

Figure 3:
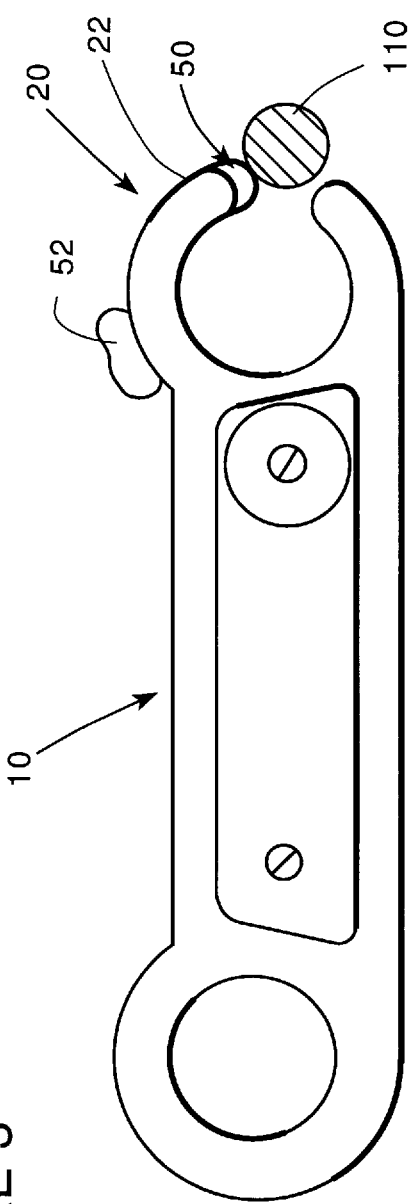
FIG. 3 is a side view of the instant invention of FIG. 2 illustrating, at the first end of the invention, the gateway member having a rotary arm, and at the second end, the first attachment means, where the gateway member is in the open position.

FIG. 3 illustrates the anchoring device 10 of FIG. 2 where the clasp region 20 is shown in the open position. In this position, the rotary arm 50 is substantially retracted into the leg 22. The thumb nub 52 is repositioned so that it is closer to the substantially curvilinear of the C-shaped gateway portion.

Figure 4:
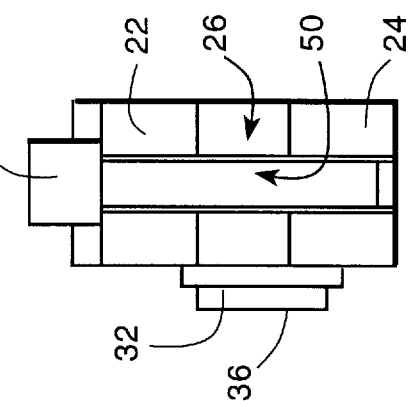
FIG. 4 a top view looking down on the mouth of the gateway member of the instant invention, where the gateway member is in the closed position.

FIG. 4 illustrates a top down view of the clasp region of the instant invention. The rotary arm 50 which is connected to the thumb nub 52 extends across the gateway 26 from leg 22 to leg 24. The cover plate 32 and the text ring 36 are shown as sequentially seated layers along one side of the body.

Figure 5:
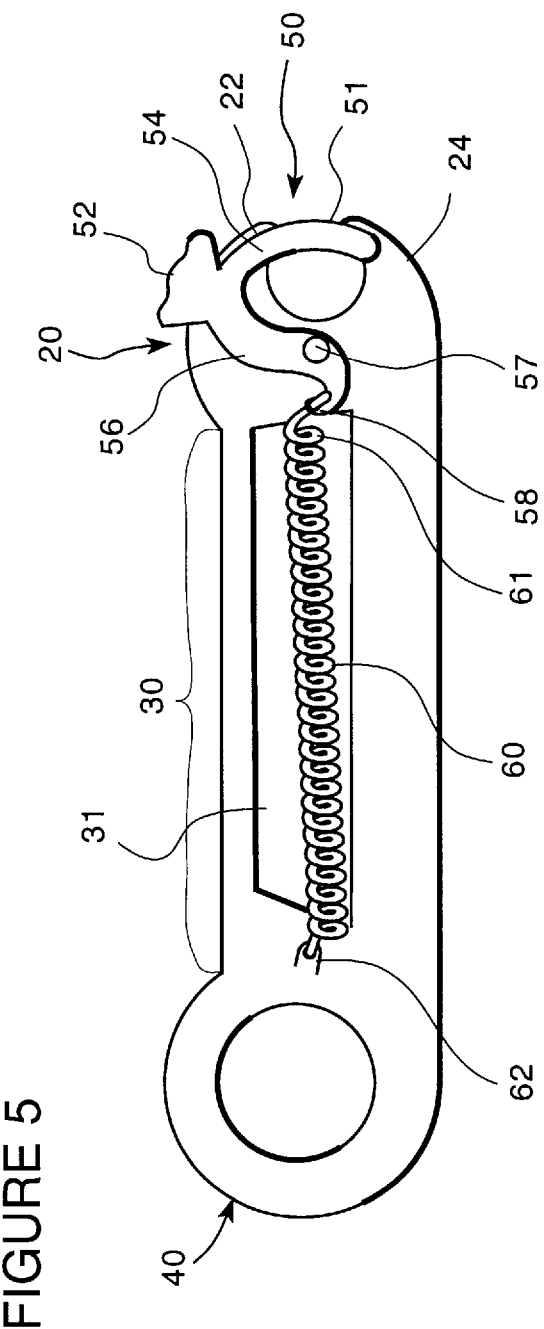
FIG. 5 a cut away side view of the instant invention where the gateway member is in the closed position.

FIG. 5 illustrates the instant invention of FIG. 2 in a cut away view showing the hollow interior 31 of the body 30 and the interior of the clasp region 20. The rotary arm 50 located in the clasp region has several contiguous parts to include a arm 54 which ends in a finger 51; a thumb nub 52; an upper arm 56 which has a pivot point 57 for receiving a pivot pin; and a connector 58 for receiving a spring 60. The pivot pin is made from steel rod of the appropriate dimensions, about 1/16 to about 1/4 inch in diameter. As can be more readily seen in this figure, leg 22 has a hollow interior for receiving the rotary arm and a slot along its outer most surface. The thumb nub which is attached to the rotary arm extends through this slot. Leg 24 has a depression in its foot for receiving the tip of the finger of the rotary arm. Following the forearm passed the elbow bend and pivot point, a hook-like extension of the arm may be seen. This is the connector 58 which receives a first end of a spring 61. The spring extends the length of the hollow body and attaches at a second end 62 of the spring to the body 30 in the region of the attachment means.

When the thumb nub is actuated, the spring is compressed and the finger is retracted from across the gateway and into the leg. Release of the thumb nub results in decompression of the spring which forces the finger back across the gateway and into the depression in the opposing leg.

Both the body and the rotary arm may be made using investment casting (also known as the "lost wax" method). When making the body a core is provided in addition to the mold in order to form the hollow housing. The rotary arm is preferably made of 17-4 PH stainless steel, an extremely strong and durable metal often used for surgical instruments. The body is preferably formed in bronze, although stainless steel or titanium could also be used. Both pieces are polished by conventional methods. Alternatively, die casting or sand casting methods could be used. A third alternative for making the body would be to cast two identical halves separately, then rivet the halves together, possibly when attaching the cover plates.

Figure 6:
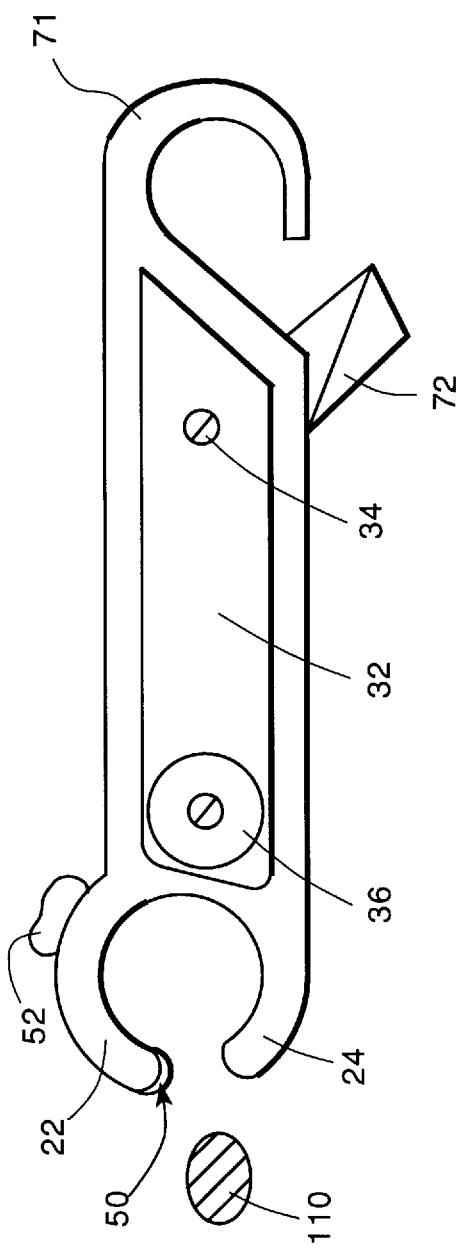
FIG. 6 is a side view of a second embodiment of the instant invention illustrating, at the first end of the invention, a gateway member having a rotary arm and, at the second end, a second embodiment of an attachment means which has a movable latch where both the gateway member and the attachment means are in the open position.

FIG. 6 illustrates a second embodiment of the instant invention in the open position wherein the attachment means is a snap hook 70 having a swing away latch mechanism 72. The clasp region 20 is as described previously. The body 30 has a cover plate 32 held to the body by a screw 34 as above. The snap hook 70 is preferably integrally attached to the body portion as shown. While alternate snap hook designs may be utilized instead of the illustrated snap hook, the design shown in FIG. 6 has the added advantage that opening of the gateway portion results in a tighter closure of the attachment means portion and vice versa. Thus, more force is required to open the attachment means when the gateway is also open. Yet, each will operate separately one from the other. The attachment means has a hook portion 71, a mouth opening situated between the end of the hook portion and the body 30, and a latch or eye lever 72 pivotally mounted at one end of the latch on the body housing. A depression 73 in the latch facilitates grasping of the latch.

Figure 7:
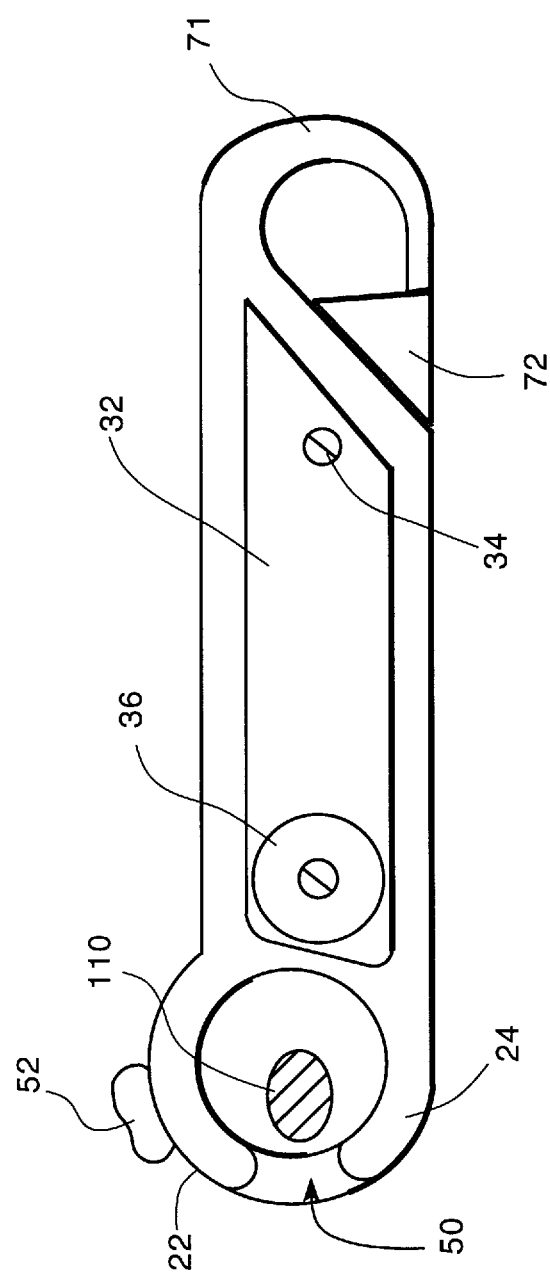
FIG. 7 a side view of a second embodiment of the instant invention illustrating, at the first end of the invention, the gateway member having a rotary arm, and at the second end, a second attachment means having a movable latch, where both are in the closed position.

In the closed position illustrated in side view FIG. 7 and in cut away view in FIG. 8, the latch 72 extends from the body across the mouth and engages the hook portion at the second end or lip 77 of the latch. When an object is enclosed by the attachment means, the object will slide back and forth across the lip. However, due to the positioning of the latch, force applied on the enclosed object will not free it from the attachment means.

FIG. 8 illustrates the latch body 74. The latch body has a pivot point 75 for mounting the latch on the body housing by means of a pivot pin. The latch body also has an extension for engaging a spring 76. The spring provides tension holding the latch in the closed position. When the latch is grasped on both sides by fingers, and a pulling force is applied, the latch opens outwardly or away from the body, clearing the gateway. Thus, an encircled ring or rope can pass through the gateway. The spring biases the latch into the closed position when the force is removed.

FIG. 9 illustrates a top plan view of the instant invention. At the first end, the thumb knob 52 is seated in a slot 26 in leg 22 of the gateway portion which is an extension of the body 30. A cover plate 32 is shown protruding from each side of the body. A screw 34 mounts the text ring 36 and the cover plate on the body. The side of the attachment means is shown at the second end of the instant invention.

FIG. 10 illustrates a bottom planar view of the anchoring device or clasp having the second embodiment of the attachment means. The clasp region 20 is located at the first end of the device and is connected to the body 30. Cover plates extend from each side of the body. A text ring is seated next to a cover plate. Both the cover plate 32 and the text ring 36 are held in place by a screw 34. At the second end of the body is an open slot 38 into which the latch body 74 can be rotated. The lip of latch 77 meets the hook portion 71 of the attachment means 70.

In an alternate embodiment of the invention, the body of the anchoring device is substantially elongated and is greater than one foot in length. The clasping means is as shown in FIGS. 6 and 7 and is located at the first end of the anchoring device as previously described with the exception that the means to actuate the closure means and thereby open and close the gateway is located at the second end of the body. The means to actuate the closure means may be connected to the curved region of the closure means or may be connected to the second end of the closure means near where the biasing means is attached. The means to actuate the closure means ends in a protrusion or frictionalized area which is accessible at the second end of the body of the anchoring means. This allows the user distance from the object or animal to be released. The second end of the body may have a means of attaching the anchoring device to a tethering means such as described above.

Uses for the anchoring device having a rapid release class include tethering animals, hot air balloons, boats and the like; safety harness anchoring device for mountaineering, window washing, building or bridge construction; a seat belt release; or when miniaturized, a jewelry clasp for a necklace.

The foregoing is considered only illustrative of the currently preferred embodiments of the invention presented herein. Since numerous modifications and changes will occur to those skilled in the art, it is not desired to limit the invention to the exact construction used to illustrate the various means comprising this invention.

What is claimed is:

1. An anchoring device for releasably fastening a tethering means to a harness, collar, and the like, said anchoring device comprising:

a body having two walls surrounding a hollow interior, a first body end, and a second body end;

a clasp region comprised of a gateway opening, a backbone, a leg extending to said gateway opening from said backbone and a pivot point, said clasp region attached parallel to said first end of said body at said backbone, said gateway opening of said clasp region opposite said backbone;

a closure means having a first closure means end and a second closure means end, said closure means attached to said clasp region at said pivot point;

a finger having a length at least equal to said gateway opening, said finger located at said first closure means end;

a means for biasing said closure means about said pivot point; and a means for attaching said tethering means to said body at said second body end.

2. The rapidly releasable anchoring device of claim 1 wherein said means for biasing is a spring.

3. The rapidly releasable anchoring device of claim 2 further including a means for covering said hollow interior of said body and for covering said closure means.

4. The rapidly releasable anchoring device of claim 3 wherein said means for attaching said tethering means permanently fixes said tethering means to said anchoring device.

5. The rapidly releasable anchoring device of claim 3 wherein said means for attaching is a through-hole for receiving said tethering means.

6. The rapidly releasable anchoring device of claim 3 wherein said means for attaching is a snap hook.

7. The rapidly releasable anchoring device of claim 3 wherein said means for attaching is a spring biased latch.

8. A rapidly releasable anchoring device comprising:

a body having a first body end, a second body end, and a hollow interior;

a pivot pin;

a clasp region seated at said first body end, said clasp region having a mouth opening located substantially opposite said second body end and a clasp region pivot point for receiving said pivot pin;

a rotary arm closure means comprised of a rotary arm closure means pivot point for receiving said pivot pin, a first closure end for blocking said mouth opening, a second closure end, a curved region extending from said first closure end to said second closure end;

a retractor on said curved region;

a mechanism for biasing said rotary arm closure means, said mechanism having a first mechanism end for connecting to said rotary arm closure means at said second closure end and a second mechanism end for connecting to said second body end, said mechanism for biasing seated in said interior of said body.

9. The rapidly releasable anchoring device of claim 8 wherein said mechanism for biasing is a spring.

10. The rapidly releasable anchoring device of claim 9 wherein said retractor is selected from the group consisting of a protrusion and a textured area.

11. The rapidly releasable anchoring device of claim 10 wherein said retractor is located at said second end of said body.

12. The rapidly releasable anchoring device of claim 11 further comprising a means for enclosing said hollow interior of said body.

13. The rapidly releasable anchoring device of claim 11 further including an attachment means.

14. A rapidly releasable anchoring device comprising:

a body having a first body end, a second body end, and at least three walls surrounding a hollow interior, said walls extending from said first body end to said second body end;

a pivot pin;

a clasp region seated at said first body end, said clasp having a gateway opening located substantially opposite said second body end and a clasp region pivot point for receiving said pivot pin;

a rotary arm closure means having a rotary arm closure pivot point for receiving said pivot pin, a first rotary arm closure end for blocking said gateway opening of said clasp region, a second rotary arm closure end, a curved region extending from said first rotary arm closure end to said second rotary arm closure end;

a retractor seated on said curved region;

a second closure means at said second body end, said second closure means having a mouth opening;

a means for biasing said first closure means and said second closure means, said means for biasing having a first end for connecting to said first rotary arm closure means and a second end for connecting to said second closure means, said means for biasing seated in said hollow interior of said body.

15. The anchoring device of claim 14 wherein said means for biasing is a spring.

16. The anchoring device of claim 15 wherein said mouth opening is located directly opposite said gateway opening.

17. The anchoring device of claim 15 wherein said mouth opening is at a 90° angle relative to said gateway opening.

18. The anchoringdevice of claim 17 further comprising a latch having a first side and a second side, said second side opposite said first side, said latch seated in said mouth opening, said latch capable of being displaced outwardly from said mouth opening when force is applied to said first side, said latch capable of retracting into said mouth opening when said force is removed.

19. The anchoring device of claim 18 further including a plate for covering said hollow interior, said first end and said second end of said biasing means.

20. The anchoring device of claim 14 wherein said rotary arm closure means is comprised of 17-4PH steel.

* * * * *